United States Patent [19]
Chiu

[11] Patent Number: 5,865,065
[45] Date of Patent: Feb. 2, 1999

[54] HAND BRAKE FOR A WHEELED WALKER

[75] Inventor: Johnny J.T. Chiu, Taipei, Taiwan

[73] Assignee: Valentine International Limited, Taipei, Taiwan

[21] Appl. No.: 941,725

[22] Filed: Oct. 1, 1997

[51] Int. Cl.[6] ........................................ F16C 1/14
[52] U.S. Cl. .............................. 74/502.2; 74/489
[58] Field of Search .................... 74/502.2, 502, 74/501.6, 488, 489

[56] References Cited

U.S. PATENT DOCUMENTS

| | | | |
|---|---|---|---|
| 5,279,180 | 1/1994 | Henriksson | 74/502.2 |
| 5,664,460 | 9/1997 | Hewson | 74/502.2 |

FOREIGN PATENT DOCUMENTS

| | | | |
|---|---|---|---|
| 1057476 | 3/1954 | France | 74/489 |

*Primary Examiner*—Charles A. Marmor
*Assistant Examiner*—Mary Ann Battista
*Attorney, Agent, or Firm*—Bacon & Thomas, PLLC

[57] ABSTRACT

The hand brake includes a main frame fixedly mounted on a handlebar of the walker, a control lever pivotally connected to the main frame, a brake member pivotally connected to the control lever to locate in a working space of the control lever, and a steel cable connected to the brake member. With changes in positions of the control lever, the brake member is caused to change its position in the working space of the control lever to pull the steel cable and thereby to either brake the wheeled walker, to brake and park the wheeled walker, or to return the walker to a non-brake state.

1 Claim, 5 Drawing Sheets

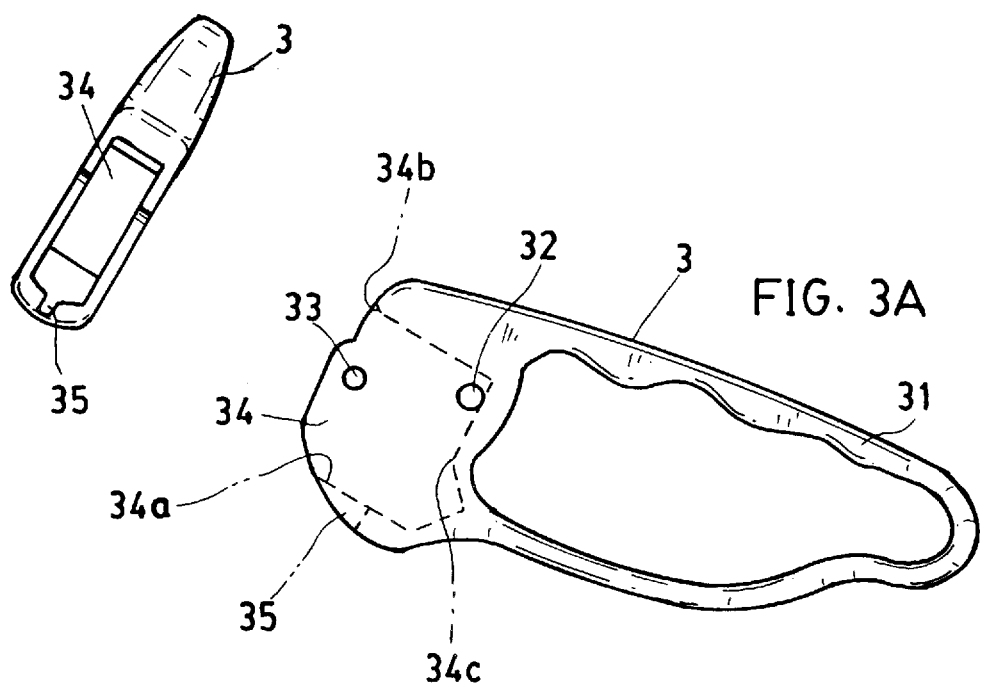
FIG. 3C
FIG. 3A
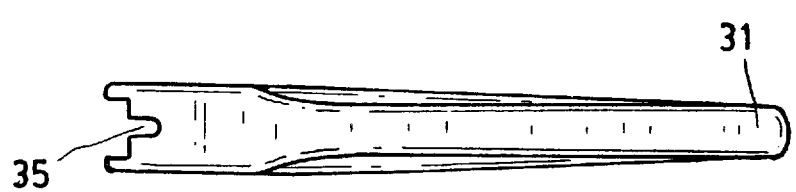
FIG. 3B

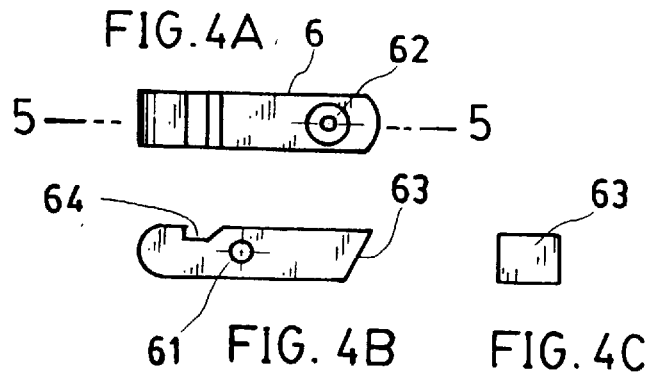
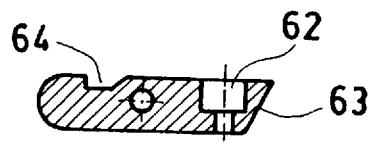
FIG. 5
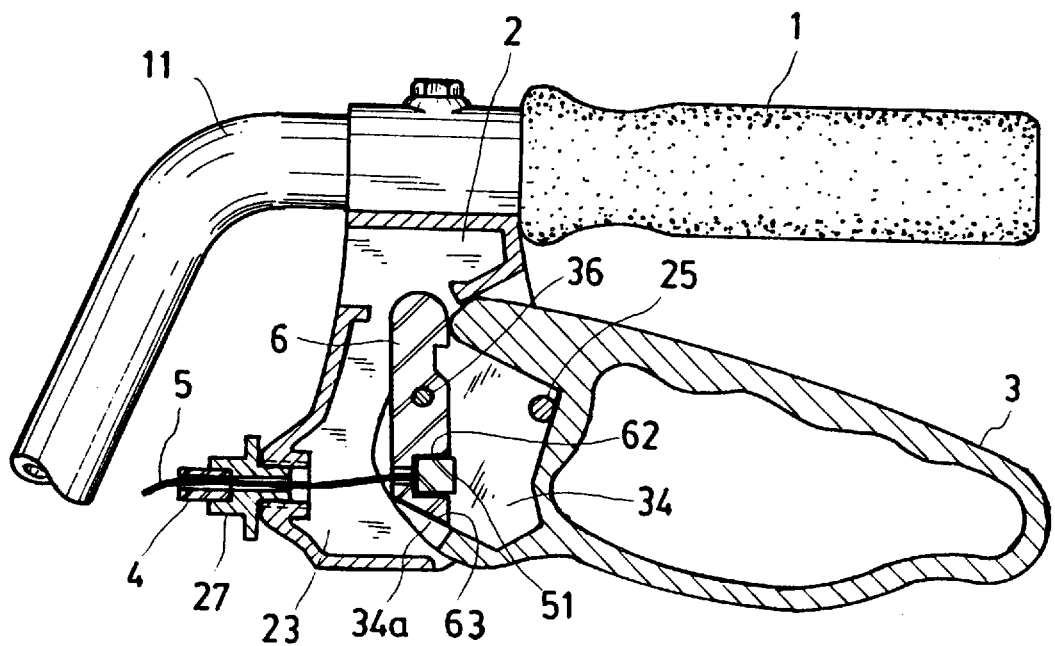
FIG. 6

HAND BRAKE FOR A WHEELED WALKER

BACKGROUND OF THE INVENTION

The present invention relates to a brake for a walker, and more particularly to a hand brake for a wheeled walker to easily control a brake cable so as to control the speed reduction and/or the stop of the walker conveniently.

A wheeled walker is a small-scaled non-motor vehicle generally provided for use by the aged, the disabled, and/or patients, so that a user and/or a person who take care of the user may easily manipulate the walker to conveniently move the user to different places, such as to outdoors, for the user to do, for example, rehabilitation exercise with the help of the walker. The wheeled walker is equipped with braking elements to slow or stop the walker, lest it should dangerously slide at high speed or slip away, particularly when the walker is moving on a slope. To protect the user and to facilitate the use of the walker by the user, all the parts and components of the wheeled walker, particularly the brake system that has close relation to the safety of user, are designed to allow the user to operate the wheeled walker in a convenient and safe manner.

SUMMARY OF THE INVENTION

It is a primary object of the present invention to provide a hand brake for a wheeled walker which not only functions like a general brake means to reduce speed or stop the walker, but also can remain in a completely working position to set the walker in a completely stopped and stable state without the need of keeping holding the hand brake by the user. That is, the object of the present invention is to provide a brake structure which can be easily manipulated to actually brake a wheeled walker, to release the walker from a braked condition, and/or to park the walker.

BRIEF DESCRIPTION OF THE DRAWINGS

FIGS. 3A, 3B, and 3C are the front view, the bottom view, and the left side view of a control lever of the present invention;

FIGS. 4A, 4B, and 4C are the top view, the front view, and the right side view of a brake member of the present invention;

FIG. 5 is a cross sectional view taken on line 5—5 of FIG. 4A;

FIG. 6 is a front sectional view of the present invention in an assembled and non-brake state;

DETAILED DESCRIPTION OF THE PREFERRED EMBODIMENT

Figure 1:
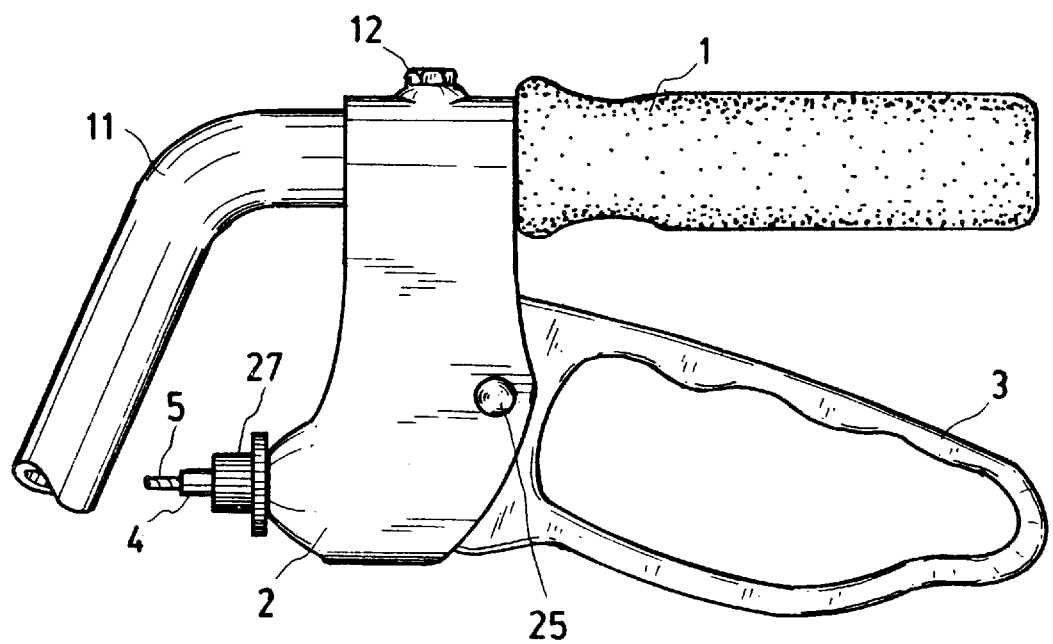
FIG. 1 is a front elevational view of a hand brake of the present invention connected to a handlebar of a wheeled walker.

Please refer to FIG. 1 in which a hand brake for a wheeled walker according to the present invention is shown. The hand brake of the present invention mainly includes a main frame 2 installed on a handlebar 11 connected to a handlebar grip 1 of the wheeled walker, a control lever 3 pivotally connected to the main frame 2, and a set of transmission cable which includes a sleeve portion 4 and a steel cable 5. The sleeve portion 4 is mounted onto the main frame 2 and the steel cable 5 is connected at one end to a brake member 6 disposed inside the control lever 3. A description of the brake member 6 in more details will be made herein later. By manipulating the control lever 3 to move it into different working positions, the steel cable 5 is pulled to set the wheeled walker in either a braking state, a freely walking state, or a parking state.

Figures 2A, 2B, 2C:
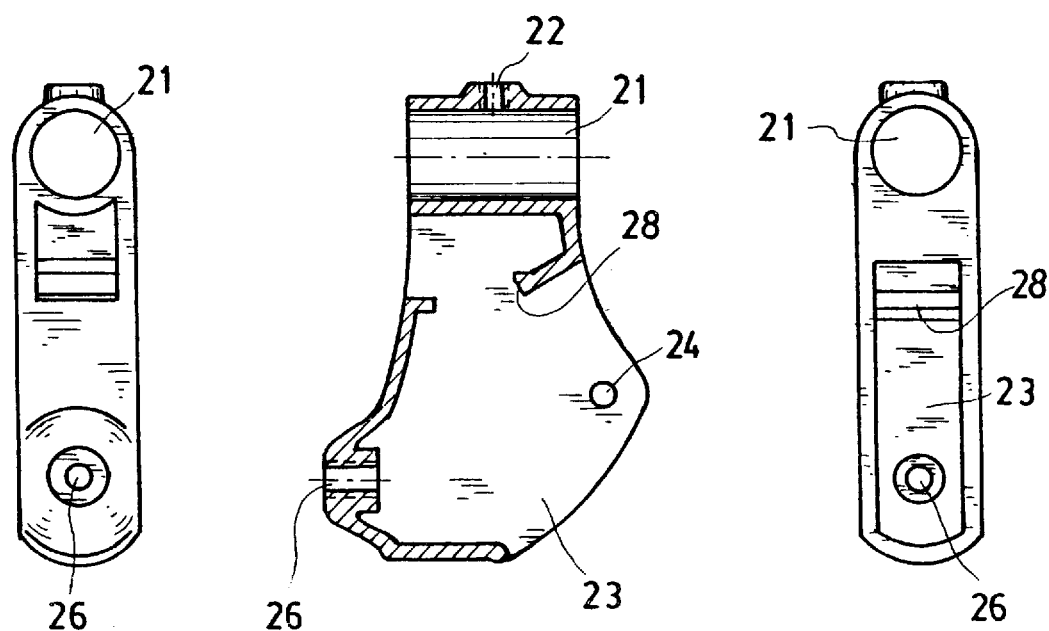
FIGS. 2A, 2B, and 2C are the front sectional view, the left side view, and the right side view of a main frame of the present invention.

FIGS. 2A, 2B, and 2C illustrate a structure of the main frame 2. Wherein, FIG. 2A is a front sectional view of the main frame 2 of FIG. 1, while FIGS. 2B and 2C are left and right side views thereof, respectively. The main frame 2 has a through passage 21 formed at an upper portion for the handlebar 11 of the wheeled walker to extend therethrough. The passage 21 is formed at a top with a thread hole 22 through which a screw 12 is threaded to fixedly attach the main frame 2 to the handlebar 11. The main frame 2 also defines a working space 23 in a lower portion thereof below the through passage 21. A pair of pivotal holes 24 are formed on two side walls of the main frame 2 defining the working space 23 near a right side thereof. A locating pin 25 (as shown in FIG. 1) may be extended through the holes 24 to pivotally connect the control lever 3 to the main frame 2, such that the control lever 3 may be turned about the locating pin 25 to move upward and downward relative to the handlebar 11. An internally threaded hole 26 is formed at a lower left corner of the main frame 2 for an adjusting means 27 to mount thereto. The sleeve portion 4 is mounted on the adjusting means 27 and the steel cable 5 extends through the sleeve portion 4 and into the main frame 2. A retaining plate 28 is formed inside the main frame 2 slightly below the passage 21 to inclinedly project downward from the upper right side of the main frame 2. The function of the retaining plate 28 will be described in details herein later.

FIGS. 3A, 3B, and 3C illustrate a structure of the control lever 3. The control lever 3 includes a handling lever 31 and a working space 34 opposite to the handling lever 31 and defined by a lower wall portion 34a, an upper wall portion 34b, a back wall portion 34c, and two side walls. Two pairs of pivotal holes 32 and 33 are formed on the side walls of the working space 34. The pair of holes 32 correspond to the pivotal holes 24 of the main frame 2, so that the locating pin 25 may be extended through the holes 24 and 32 to pivotally connect the control lever 3 to the main frame 2, allowing the control lever 3 to turn about the locating pin 25 to move in the working space 23 of the main frame 2.

Another locating pin 36 is extended through the pair of holes 33 to pivotally connect the brake member 6, so that the brake member 6 is disposed inside the working space 34 of the control lever 3 and turnable about the locating pin 36. The brake member 6 contacts with the lower, upper and back wall portions 34a, 34b, and 34c to cooperate with these wall portions to control the steel cable 5.

FIGS. 4A, 4B, 4C, and 5 illustrate a structure of the brake member 6. The brake member 6 is a long bar-like member having a through hole 61 transversely extending across a central portion thereof, and a stepped hole 62 is provided at a right portion thereof. A right side wall of the brake member 6 forms a downward and inward inclined surface 63. A recess 64 extends across a top left portion of the brake member 6. The through hole 61 corresponds to the pair of holes 33 of the control lever 3, such that the locating pin 36 may be threaded through the holes 33 and 61 to pivotally connect the brake member 6 to the control lever 3 for the member 6 to turn about the pin 36 inside the working space 34 of the control lever 3. A large-diameter portion of the stepped hole 62 facing inner side of the working space 34 receives therein a retaining block 51 which is connected to one end of the steel cable 5 and is a conventional member in the transmission cable, such that the steel cable 5 may be pulled by the brake member 6 when the latter is pivotally moved in the working space 34 of the control lever 3. The inclined surface 63 of the brake member 6 generally rests against the lower wall portion 34A of the working space 34 when the hand brake of the present invention is in a non-brake state. When the control lever 3 is upward pulled toward the handlebar grip 1, it pulls the steel cable 5 connected to the brake member 6 to brake the walker. This will be described in more details herein later. The transverse recess 64 engages with a free end of the outward projected retaining plate 28 of the main frame 2 when the control lever 3 is downward pushed away from the handlebar grip 1, and therefore allows the whole wheeled walker to park in place without the need to keep holding the control lever 3 down by a user.

FIG. 6 illustrates the hand brake of the present invention in a non-brake state, wherein the main frame 2 is fixedly installed onto the handlebar 11 and the control lever 3 is connected to the main frame 2 by means of the locating pin 25 while the brake member 6 is connected to the control lever 3 by means of the locating pin 36, and the retaining block 51 is located in the stepped hole 62 with the steel cable 5 extending through a small-diameter portion of the stepped hole 62 to pass through the adjusting means 27 and to finally connect to a brake structure (not shown) mounted on a wheel of the walker. Since this is a prior art and is therefore not described in detail herein. Moreover, the sleeve portion 4 is located between the main frame 2 and the brake structure on the walker's wheel, and the inclined surface 63 of the brake member 6 contacts with the lower wall portion 34a of the working space 34.

Figure 7:
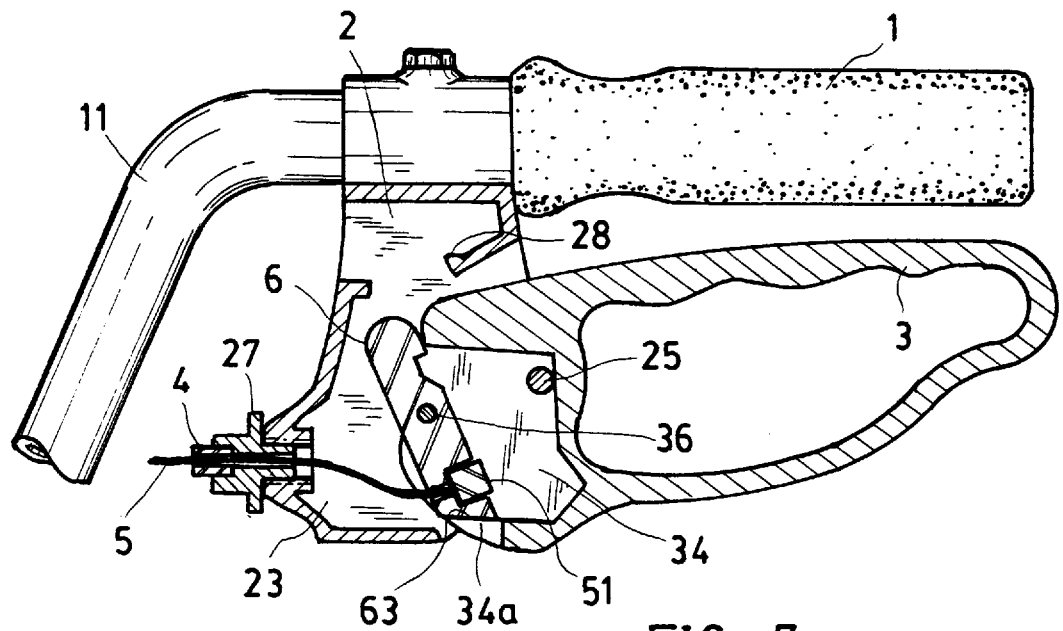
FIG. 7 is a front sectional view similar to FIG. 6 but in a braking state.

As shown in FIG. 7, when the control lever 3 is pulled about the locating pin 25 toward the handlebar grip 1, the lower wall portion 34a contacting with the inclined surface 63 shall force the brake member 6 to pivotally turn about the locating pin 36 and thereby pulls the steel cable 5 which causes the wheeled walker to brake. The closer the control lever 3 is pulled toward the grip 1, the firmer the walker is braked.

Figure 8:
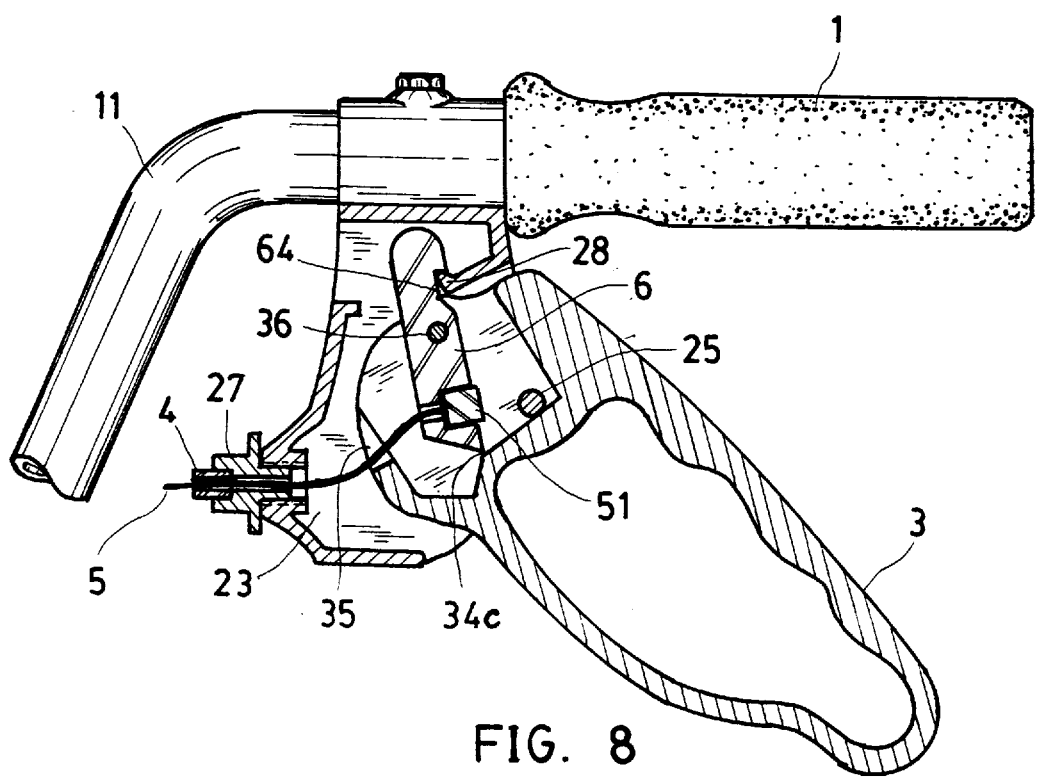
FIG. 8 is an assembled front sectional view of the present invention in a park braking state.

Please refer to FIG. 8, when the user needs to park the wheeled walker without keeping pulling and holding the control lever 3 in an upward position, the user may simply push the handling lever 31 downward. At this point, the brake member 6 moves upward with the shifted locating pin 36 on the control lever 3 with the recess 64 at its top left portion being moved to a position slightly above the retaining plate 28 of the main frame 2. When the handling lever 31 is further pushed downward, the back wall portion 34c of the working space 34 shall eventually contact with a top right end of the brake member 6 and allows the recess 64 to engage with the retaining plate 28 and be held thereto. Meanwhile, the steel cable 5 will fall into a preformed groove 35 on the lower wall portion 34a and be pulled toward the control lever 3. With the engagement of the recess 64 with the retaining plate 28, the steel cable 5 is prevented from retracting to maintain the walker in a braked state even there is no longer any force applied on the handling lever 31 of the control lever 3. That is, the walker is braked to park in a stationary condition. To release the walker from the braked and parking state, simply pull the handling lever 31 upward, so that the upper wall portion 34b of the working space 34 of the control lever 3 is pushed toward the brake member 6 and the locating pin 36 is moved downward to together with the upper wall portion 34b disengage the recess 64 of the braking member 6 from the retaining plate 28, returning the whole hand brake to a non-brake state.

Figure 9:
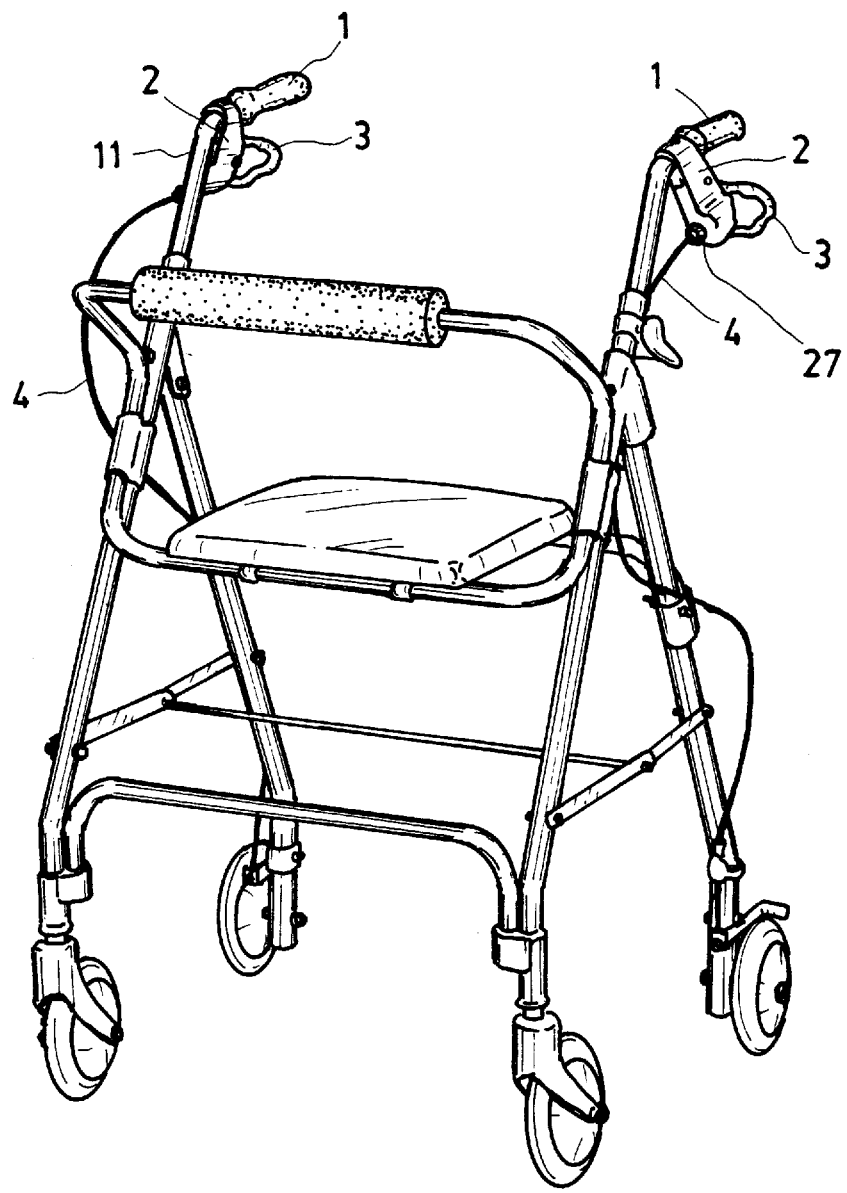
FIG. 9 is a perspective of a wheeled walker equipped with the hand brake of the present invention.

FIG. 9 illustrates a wheeled walker equipped with the hand brake of the present invention.

What is claimed is:

1. A hand brake of a wheeled walker being installed on a handlebar grip (1) of the walker to control a transmission cable connected at one end to the hand brake and at the other end to a brake structure mounted on a wheel of the walker, comprising:

a main frame (2) being fixedly mounted onto the handlebar grip (1) of the walker and defining an inner working space (23), pivotal holes (24) being formed on two side walls of said working space for a first locating pin (25) to extend therethrough, an internally threaded hole (26) being provided at a lower left side of said main frame (2) for an adjusting means (27) to screw thereinto, a sleeve portion (4) being connected to said adjusting means (27) for a steel cable (5) forming a part of the transmission cable to extend through said sleeve portion (4), said adjusting means (27) and into said working space (23), and a retaining plate (28) downward and inward projecting into said working space (23) from an upper right portion of said main frame (2);

a control lever (3) including a handling lever (31) and a working space (34) opposite to said handling lever (31) and defined by a lower wall portion (34a), an upper wall portion (34b), a back wall portion (34c) and two side walls, two pairs of pivotal holes (32 and 33) being formed on said side walls of said working space (34), one of said pair of holes (32) being corresponding to said holes (24) on said main frame (2), such that said first locating pin (25) may extend through said holes (24) on said main frame (2) and said one of said pair of holes (32) to pivotally connect said control lever (3) to said main frame (2), and the other of said pair of holes (33) allowing a second locating pin (36) to extend therethrough;

a brake member (6) in the form of a long bar having a through hole (61) transversely extending across a central portion thereof to correspond to said other of said pair of holes (33) of said control lever (3), so that said second locating pin (36) may be extended through said other of said pair of holes (33) and said through hole (61) to pivotally connect said brake member (6) to said control lever (3), said brake member (6) also being provided at a top right portion with a stepped hole (62) to receive the steel cable (5) and a retaining block (51) connected to one end of said steel cable (5), and at a top left portion with a transverse recess (64) for engaging with said retaining plate (28) when said hand brake is pushed downward, and said brake member having a right side forming a downward and inward inclined end surface (63) which normally contacts with said lower wall portion (34a) of said working space (34) of said control lever (3); and a set of transmission cables for braking purposes, including said sleeve portion (4) and said steel cable (5) while said steel cable (5) having said retaining block (51) connected to an end thereof inside said working space (34) of said control lever (3);

whereby when said handling lever (31) of said control lever (3) is pulled upward toward the handlebar grip (1), said brake member (6) is shifted to pull said steel cable (5) outward and therefore brakes the wheeled walker, and when said handling lever (31) is pushed downward away from said handlebar grip (1), said brake member (6) is shifted upward to have said recess (64) engaged with said retaining plate (28) on said main frame (2) and be held thereto, permitting said hand brake to maintain in a working position without the need of keeping holding said handling lever (31) in a lowered position by a user.

* * * * *